United States Patent
Luster

(10) Patent No.: US 10,254,088 B1
(45) Date of Patent: Apr. 9, 2019

(54) REMOVABLE BALLISTIC RESISTANT WINDSHIELD

(71) Applicant: Armorworks Holdings, Inc., Chandler, AZ (US)

(72) Inventor: Matthew Luster, Mesa, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 0 days.

(21) Appl. No.: 15/883,995

(22) Filed: Jan. 30, 2018

(51) Int. Cl.
| | | |
|---|---|---|
| *F41H 5/26* | (2006.01) | |
| *B60J 1/00* | (2006.01) | |
| *B60J 1/06* | (2006.01) | |

(52) U.S. Cl.
CPC .............. *F41H 5/263* (2013.01); *B60J 1/006* (2013.01); *B60J 1/007* (2013.01); *B60J 1/06* (2013.01)

(58) Field of Classification Search
CPC .. F41H 5/263; B60J 1/006; B60J 1/007; B60J 1/06; B60J 1/04
USPC ....... 296/187.07, 190.1, 96.21, 96.22, 96.13, 296/96
See application file for complete search history.

(56) References Cited

U.S. PATENT DOCUMENTS

| | | | | |
|---|---|---|---|---|
| 8,382,191 B2 * | 2/2013 | Hafften | .................... | F41H 5/226 296/146.1 |
| 2004/0075283 A1 * | 4/2004 | Kobrehel | ............ | E05B 65/1033 292/171 |
| 2006/0175866 A1 * | 8/2006 | Dankert | ...................... | B60J 1/12 296/146.16 |
| 2011/0084521 A1 * | 4/2011 | Shellenberger | .......... | B60J 1/007 296/193.08 |
| 2011/0291849 A1 * | 12/2011 | Helms | ................... | E05B 13/106 340/669 |
| 2012/0068495 A1 * | 3/2012 | Germenot | .................. | B60J 1/04 296/97.8 |
| 2016/0363419 A1 * | 12/2016 | Tunis, III | .................. | F41H 5/26 |
| 2018/0149449 A1 * | 5/2018 | Trudeau | ..................... | F41H 7/04 |

FOREIGN PATENT DOCUMENTS

WO    WO-2013184356 A1 * 12/2013 ............. F41H 5/263

* cited by examiner

*Primary Examiner* — Jason S Morrow
(74) *Attorney, Agent, or Firm* — James L Farmer

(57) ABSTRACT

Methods and apparatus are provided for a removable ballistic resistant windshield for vehicle egress. The windshield includes a ballistic resistant glass panel in a rectangular windshield frame with a perimeter portion configured to fit within a rectangular opening in a vehicle cab. The windshield frame may further include an exterior flange configured to overlay an outside surface of the opening in the vehicle cab, and an interior flange extending from the windshield frame opposite the exterior flange. The exterior and interior flanges define an open channel on a first side of the windshield frame configured to fit around a vertical portion of the opening in the vehicle cab when the windshield is seated in the opening. A spring-loaded latch on the windshield frame is operable from inside the vehicle cab to release a second, opposite side of the windshield frame from the opening in the vehicle cab.

29 Claims, 11 Drawing Sheets

REMOVABLE BALLISTIC RESISTANT WINDSHIELD

TECHNICAL FIELD AND BACKGROUND

The technical field of the present invention relates to vehicle windshields, and more particularly windshields that are removable for emergency egress.

In certain vehicle accidents it may be difficult, impossible, or unsafe to exit from the doors of the vehicle. In a typical vehicle roll-over, for example, one door is under the cab and the other door facing upward. When the vehicle is a heavy truck, or in particular an armored vehicle, the weight of the door makes it difficult to lift open and hold open, both for an emergency responder and more so for a vehicle occupant attempting this from the inside of the vehicle cab. Egress through the windshield frame may be the fastest and safest alternative.

For this reason the windshields in certain large vehicles or trucks, and in particular ballistic resistant windshields in certain military vehicles, are designed so that the windshield can be removed, either from inside or outside the vehicle, when exiting from the doors is difficult or unsafe. One such example of a removable ballistic resistant windshield is disclosed in U.S. Pat. No. 8,382,191 issued to BAE Systems of Santa Clara, Calif. The disclosed system uses two handle-operated cam locks, one lock on each side of the left and right windshield panels, to retain and release each panel. In order to release the windshield after a rollover, the passenger or rescuer must rotate both handles in the correct direction, and far enough to release the cam latches. The windshield panels must then be pushed outward with sufficient force to dislodge the windshield from the vehicle and cause it to fall away. However, due to the holding forces necessary to properly retain and seal the windshield, rotating the handles to release the windshield can be difficult, particularly for an injured vehicle occupant or under emergency conditions. In addition, because the windshields may be removed from outside the vehicle by simply rotating the outside handles, the vehicle cab is left effectively unlocked at all times and thus vulnerable to intrusion.

DESCRIPTION OF THE EMBODIMENTS

Figure 1:
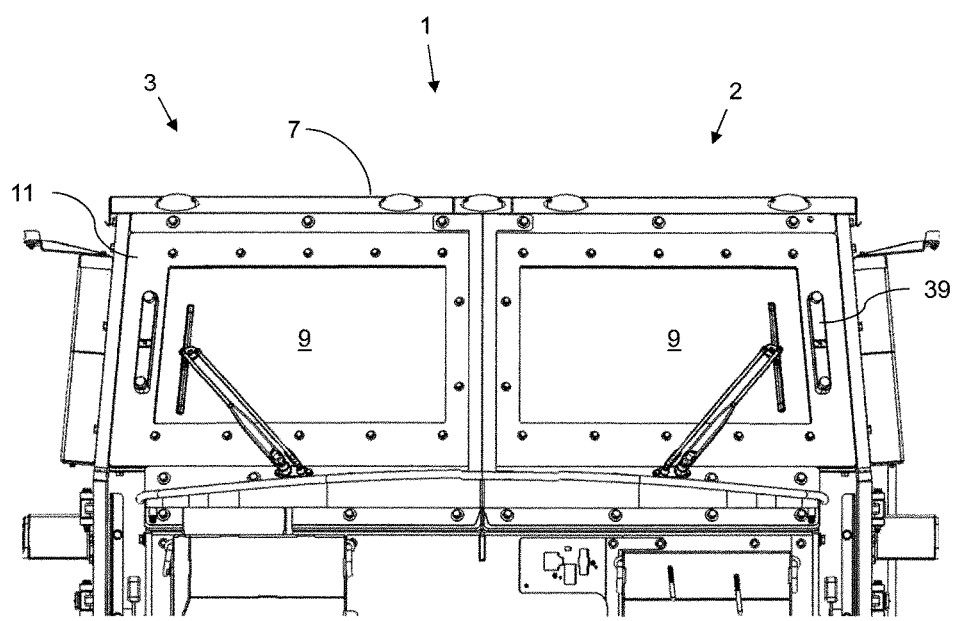
FIG. 1 is an outside front view of an exemplary armored vehicle cab with removable ballistic resistant windshields in accordance with the present disclosure.
Figure 2:
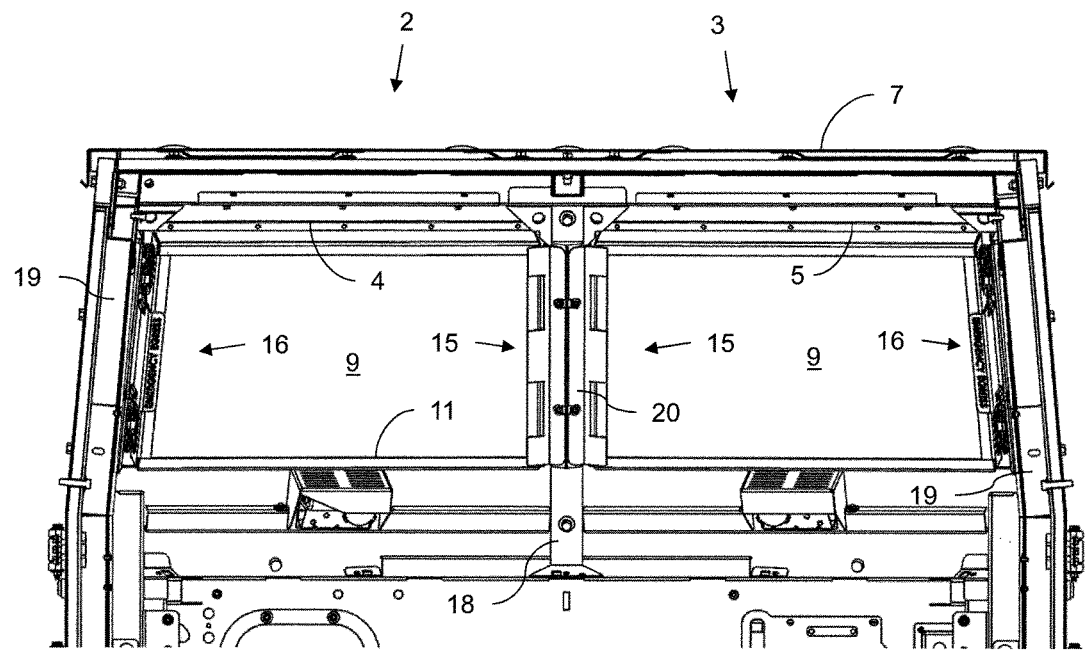
FIG. 2 is a view from inside the vehicle cab of FIG. 1 looking forward.
Figure 3:
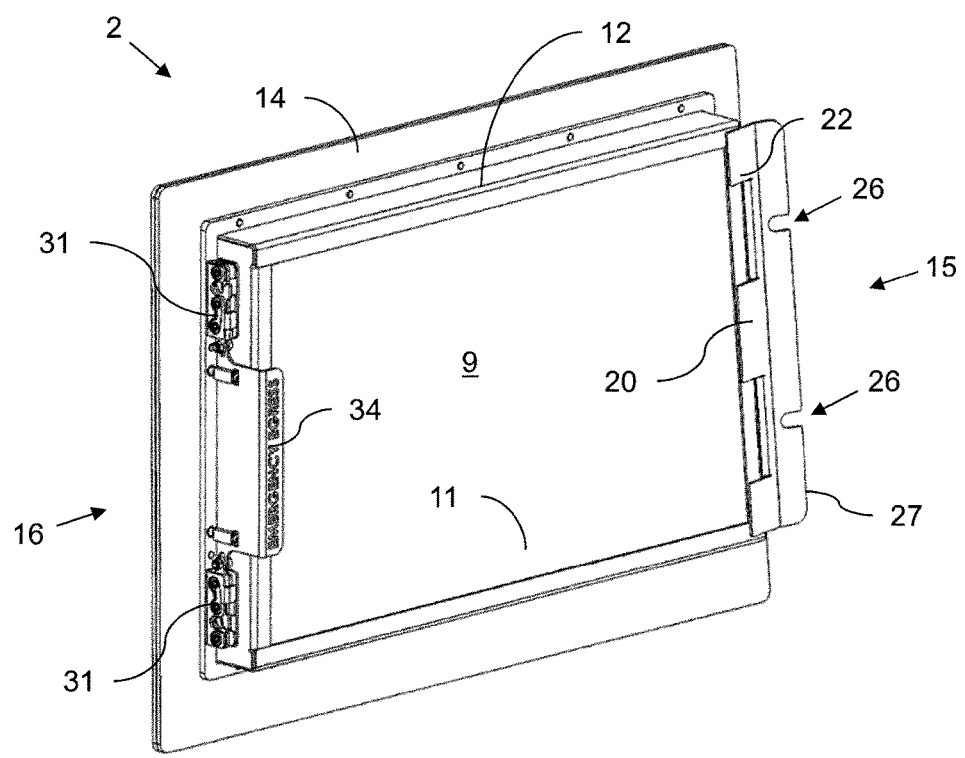
FIG. 3 is a perspective view of a removable ballistic resistant windshield panel in accordance with the present disclosure, with a latch side shown on the left, and pivot side on the right.
Figure 4:
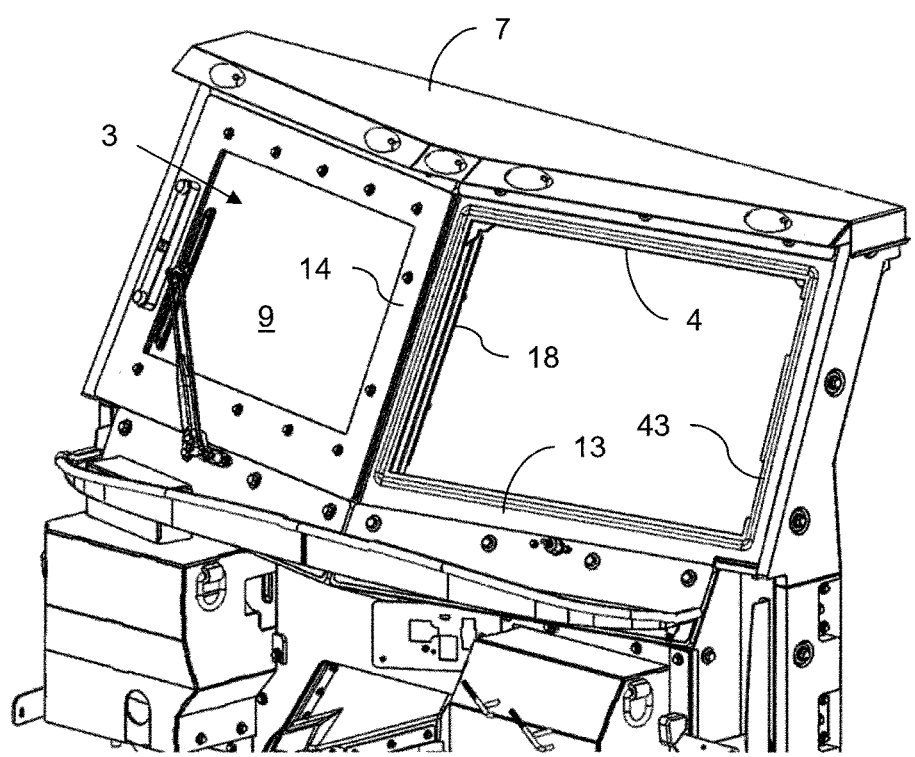
FIG. 4 is a perspective view of the front of the armored vehicle cab of FIG. 1 with the left windshield panel removed.
Figure 5:
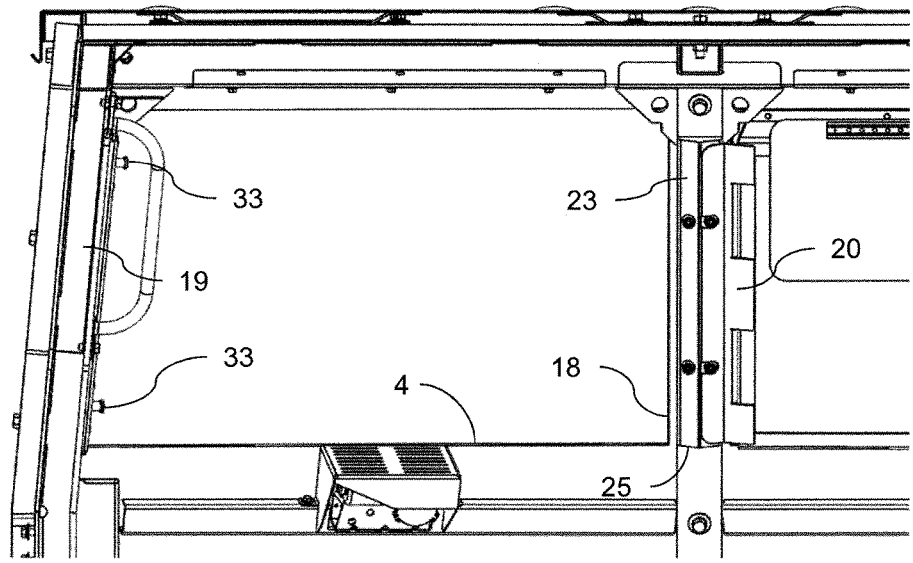
FIG. 5 is a view from inside the vehicle cab of FIG. 1 with the left windshield panel removed.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

An exemplary removable ballistic resistant windshield system in accordance with the present disclosure is indicated generally at reference numeral 1 in the drawing Figures. Referring initially to FIGS. 1 through 5, the windshield system comprises left and right removable ballistic resistant windshields 2 and 3, disposed in left and right windshield openings 4 and 5 of an armored vehicle cab 7. Each windshield consists of a ballistic resistant glass panel 9, often referred to as "transparent armor", mounted in a windshield frame 11 made of a strong, ballistic resistant material such as steel. The windshield and frame may be rectangular as shown, with an inset portion 12 of the frame (see FIG. 3) disposed about and capturing a perimeter portion of the glass panel, and configured to fit within a respective windshield opening. The windshield frame further includes an exterior flange 14 that is larger than the inset portion, and overlaps an exterior surface 13 of the windshield opening, thereby preventing the windshield from simply falling through the windshield opening into the vehicle cab. The inset portion 12 and exterior flange 14 may be one integrated part, or separate components forming an assembly. For example, in the depicted embodiment the exterior flange is a separate bolted on component in the shape of a flat rectangular frame that overlays the inset portion 12 and defines the entire exterior surface of the windshield frame.

Each windshield has a pivoting side 15 proximate the vertical portion of the respective windshield opening nearest the center of the cab, and a latch side 16 proximate the vertical portion of the respective windshield opening nearest the side of the vehicle. The cab structural members that define the vertical portions of the windshield openings are referred to herein as center pillar 18 at the center of the cab, and side pillars 19 at the outer sides of the cab. The pivoting side 15 of each windshield includes an interior flange 20 that extends from an interior portion of the windshield frame generally toward center pillar 18, opposite a vertical portion of exterior flange 14 on the same side. In the depicted embodiment, interior flange 20 is a separate part mounted to an interior surface of inset portion 12 of the windshield frame.

Figure 6:
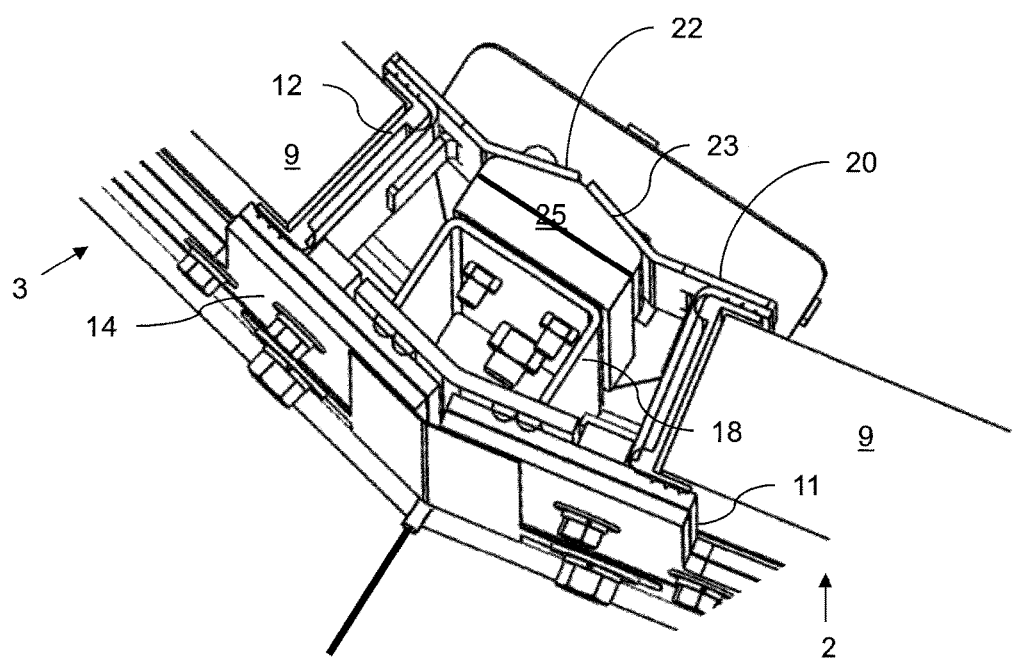
FIG. 6 is a horizontal cross-section through the center pillar of the armored vehicle cab of FIG. 1 showing portions of the left and right ballistic resistant windshield panels and flanges.

Referring now also to FIG. 6, the interior flange 20 and exterior flange 14 together define essentially an open channel, or socket, configured to receive and fit around a portion of the center pillar 18 when the windshield is installed in the cab opening. The interior flange 20 further comprises an angled portion 22 that is configured to overlay and bear against a beveled surface 23 on center pillar 18. In one embodiment the angle of portion 22 measured relative to a plane of the glass panel of the windshield is between about 20 and 30 degrees, and in a more particular embodiment about 26 degrees. As will be explained further below, the angle is selected to enable the windshield to pivot about center pillar 18 during installation and removal without binding, while resulting in a tight and secure fit when the windshield is fully installed.

The beveled surface 23 of center pillar 18 may be a surface of the actual structural element, or a surface of a separate component attached to the pillar. In the embodiment shown, surface 23 is one of two beveled surfaces 23 symmetrically disposed on a pilot block 25 attached to an interior surface of the center pillar. The pilot block 25 may be made from a low friction material to facilitate sliding of interior flange 20 across surface 23 when the windshield pivots about center pillar 18 during and installation or removal operation. Suitable materials for pilot block 25 may include various low friction polymers, such as a homopolymer variant of Acetal (PolyOxyMethylene or POM) commonly known under the trade name "Delrin", Polyhexamethylene Adiptimide (or Nylon), and Polytetrafluoroethylene (PTFE) commonly known under the trade name "Teflon".

Figure 7:
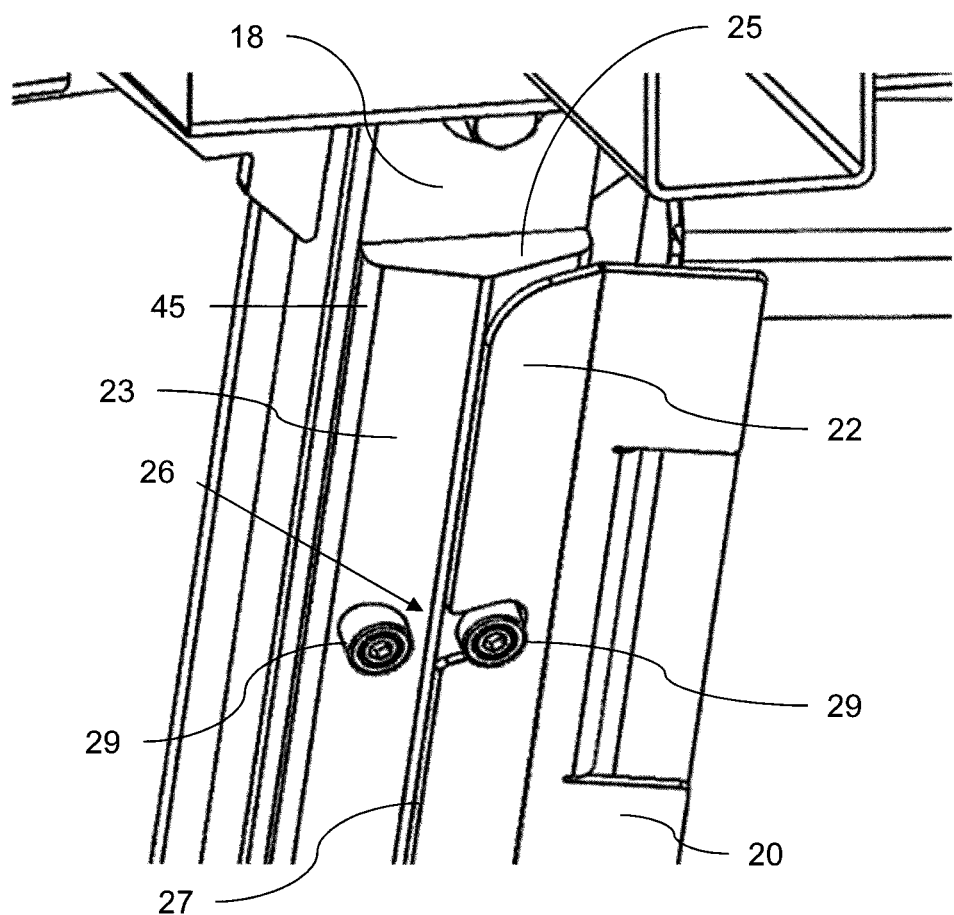
FIG. 7 is a close-up perspective view of the vehicle cab center pillar viewed from inside the vehicle cab with the left ballistic resistant windshield panel removed.

Referring now also to FIG. 7, the interior flange 20 may further include one or more slots 26 in the free vertical edge 27 of the flange that are configured to align with and receive one or more guide features 29 on center pillar 18. Guide feature 29 may be simply a round post as shown, with a diameter less than the width of slot 26 to allow the post to easily slide in and out of the slot. The guide features assist with vertical alignment and support of the pivoting side of the windshield during windshield installation.

Figure 8:
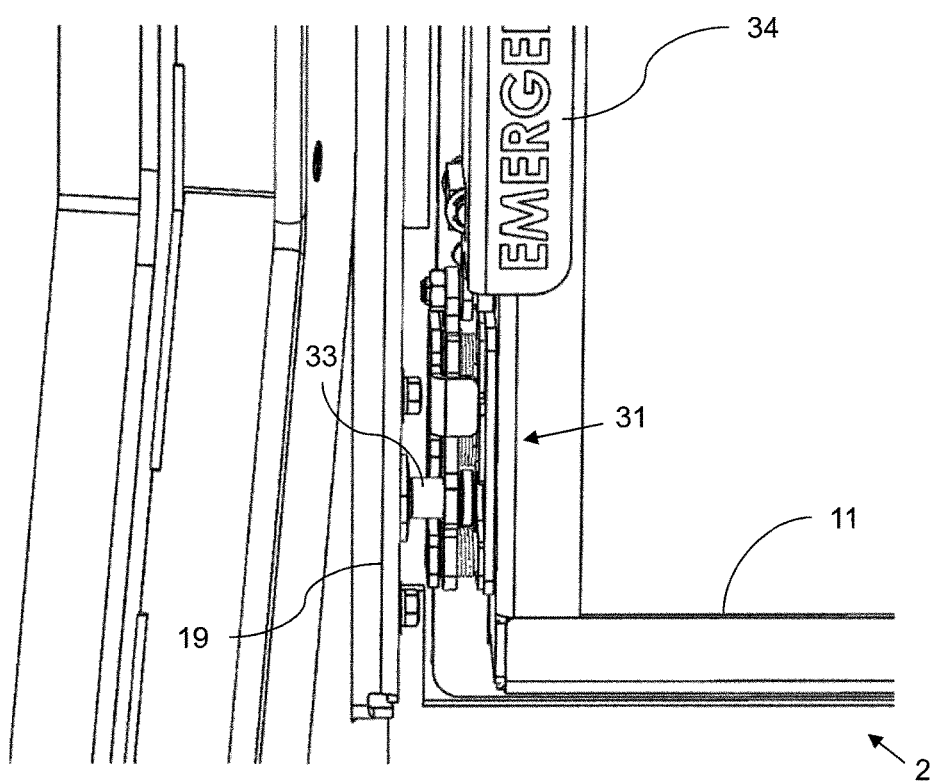
FIG. 8 is a close up view from inside the vehicle cab of a lower latch mechanism on the latch side of the windshield panel connected to the vehicle cab side pillar.

Referring now also to FIG. 8, the latch side 16 of the windshield is configured to automatically latch to the cab when the windshield is pushed into the windshield opening from the outside. The windshield may include one or more automatic latches 31 attached to the latch side of the windshield frame that are configured to engage with corresponding catch features 33 on the side pillars 19. The latches 31 may be spring loaded devices such as for example the type of spring loaded mechanisms commonly used in automobile doors in which a spring loaded hook portion of the latch captures a post on the door frame. In one embodiment the latch 31 is a dual stage rotary latch made by Eberhard Manufacturing, part numbers 20TX-17400-R-24 AND 20TX-17400-L-24, that meets automobile industry standard FMVSS206.

Figure 9:
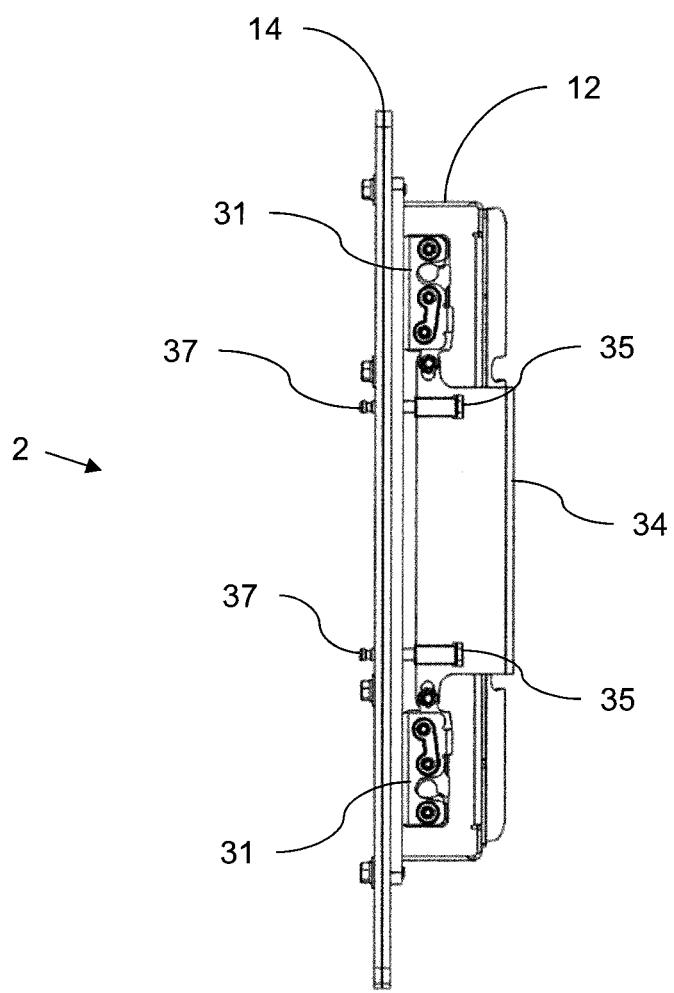
FIG. 9 is a side view from the latch side of the ballistic resistant windshield panel of FIG. 3.

Such spring loaded devices are normally held in a closed, latched condition by the springs, requiring application of an external force to overcome the spring and open the latch. The external force for opening the latches may be applied through a rigid element, such as a metal plate or bar that is operatively connected to the one or more latches 31, and accessible from within the vehicle cab. Referring now to FIG. 9, a single elongated push plate 34 is disposed on the latch side 16 of the windshield between upper and lower spring-loaded latches 31, with upper and lower ends of the push plate operatively connected to the latches. The push plate may be movably attached to the windshield in a guided manner, such as with guide bolts 35 that retain the push plate while allowing it to move in a linear path perpendicular to the windshield. The depicted guide bolts are fixed to the push plate, such as with threads, and slide in bores formed through the windshield frame, although it should be appreciated that the same result could be obtained with the arrangement reversed. The push plate is attached to the latches such that moving the push plate toward the windshield moves the latch mechanism in an unlatch direction. The push plate is accordingly mounted with enough clearance to allow it to move toward the windshield far enough for the latch mechanisms to both unlatch, and release the windshield from catch features 33 on cab. Thus the latch side of the windshield may be completely released with a single pushing motion.

The latches 31 may further include an external release feature accessible from outside of the vehicle. In the depicted embodiment the external release feature is simply the ends 37 of the guide bolts 35 protruding through the windshield frame on the outside of the exterior flange 14 as shown in FIG. 9. In this configuration the latches may be released by grasping and pulling outward on the ends 37 of both guide bolts simultaneously with enough force to pull the push plate toward the windshield and release the latches. The bolts may be conveniently pulled simultaneously using an elongated handle (not shown) configured to attach without use of additional tools to a groove or equivalent feature at the ends of the guide bolts.

Figure 10:
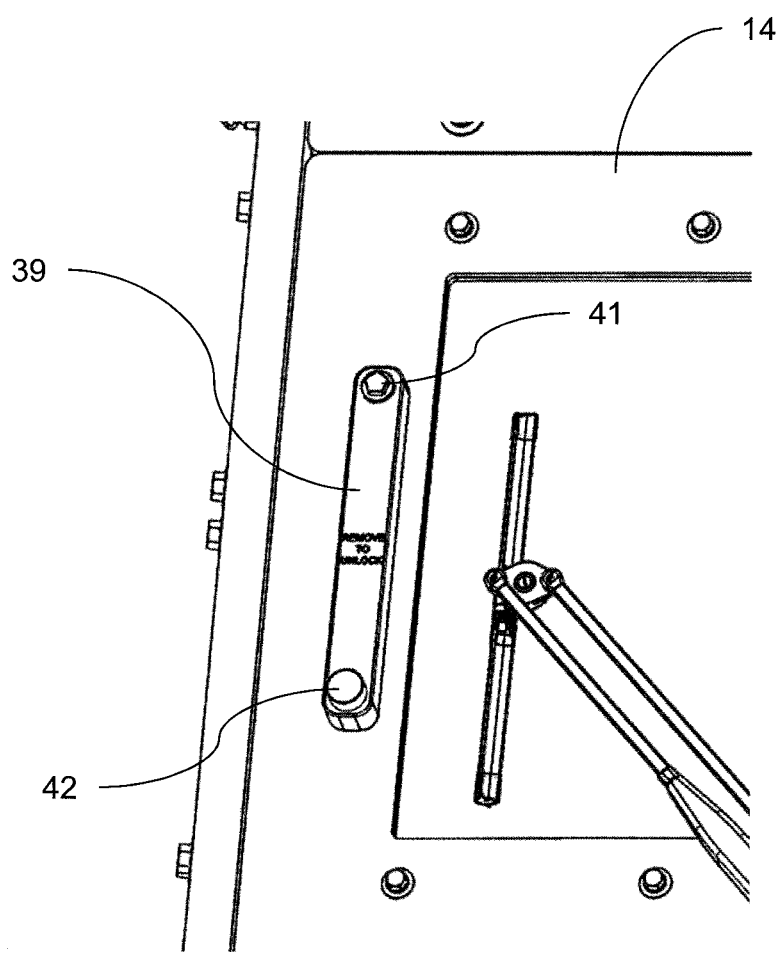
FIG. 10 is a close up view of the outside of the outside of the vehicle cab showing the tamper proof protective cover for the external windshield unlatch feature.

To discourage unauthorized access to the latching system, a protective cover 39, as shown in FIG. 10, may be installed over the guide bolts on the outside of exterior flange 14 using tamper proof fasteners 41. The fasteners 41 may be bolts with a non-standard head shape that is difficult or impossible to securely grasp with standard tools. In the depicted embodiment the fasteners 41 are bolts with five-sided, pentagonal shaped heads configured to fit a matching unique, pentagonal socket wrench (also not shown). The fasteners may be normally covered with a simple removable plastic cap 42. During vehicle operation the socket wrench and handle may be stored separate from the vehicle, for example, with crew members or on another vehicle accompanying the armored vehicle. Thus, in the case of a roll over where the vehicle occupants are incapacitated or otherwise unable to release the windshield from inside the cab, access to the cab can still be quickly accomplished from outside using the unique handle and wrench tools.

Windshield Installation

Figure 11:
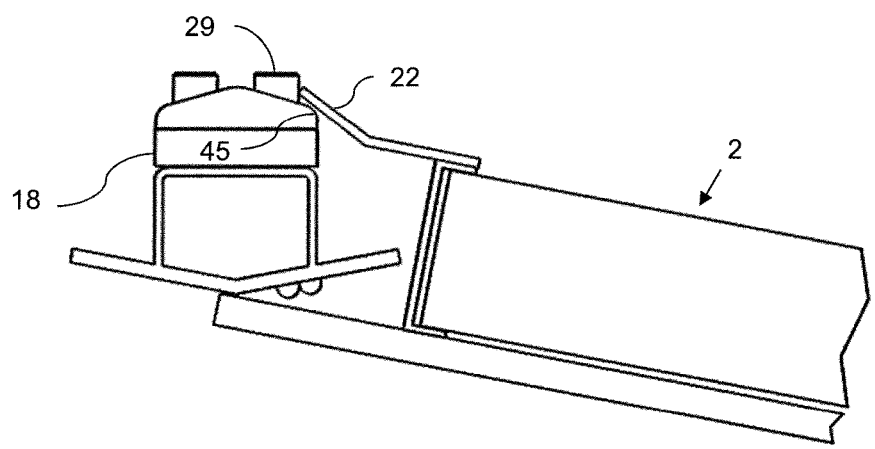
FIGS. 11 through 13 are cross sections of the left windshield panel and the vehicle cab center pillar that sequentially depict an exemplary windshield installation process.

A windshield installation operation begins at the pivoting side of the windshield. While holding a windshield panel at an angle to the cab opening, the pivoting side 15 is fitted partially onto center pillar 18. Referring to FIG. 11, the windshield is initially positioned with the exterior flange 14 overlapping the front of pillar 18, and with the angled portion 22 of flange 20 proximate a rounded interior corner 45 on the center pillar 18. The angle of the angled portion 22 of flange 20 is selected in part to ensure that the corner of the pillar does not interfere with the edge of flange 20 and prevent the windshield frame from sliding onto and around the pillar as the installation progresses.

Figure 12:
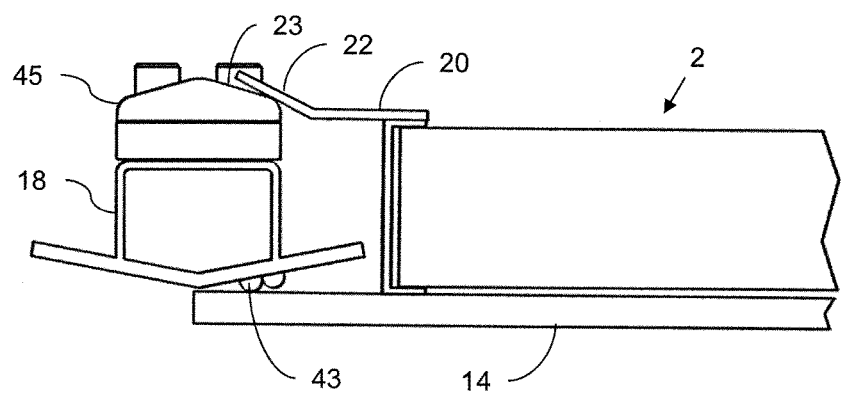

Referring next to FIG. 12, with slots 26 on interior flange 20 in vertical alignment with the guide features 29 on the pillar (as shown for example in FIG. 7), the windshield is then essentially pivoted toward the windshield opening in the cab. A pressure is simultaneously applied to the windshield toward the center pillar to ensure that the pivoting side stays continuously engaged and aligned with the center pillar. As the windshield pivots, the angled portion 22 of flange 20 begins sliding onto and across the rounded corner 45 on the center pillar, while the slots 26 of flange 20 slide around and past the guide features 29. Due in part to angled portion 22, the more the windshield pivots toward the cab, and the farther interior flange 20 moves across and around center pillar 18, the tighter the fit of the pillar between the exterior and interior flanges 14 and 20. In this regard the beveled surface and rounded corner of the center pillar are configured to cause the windshield frame exterior flange 14 to begin compressing a weather strip 43 on the outside of the cab opening at a certain point in the pivoting rotation. The particular angle of angled portion 22 of flange 20, as well as the shape of rounded corner 45, are further selected to prevent excessive binding of flange 20 on the center pillar during this process. In one embodiment the rounded corner 45 has a radius of curvature of between about one quarter inch and one inch.

Figure 13:
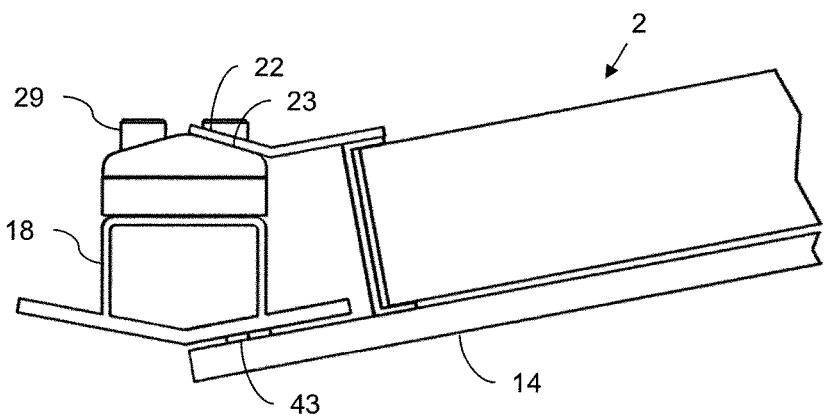

FIG. 13 shows the windshield fully rotated into the cab opening. As can be seen, the angled portion 22 of flange 20 is parallel with and bearing against the beveled surface 23 of the center pillar, and the weather strip 43 is compressed under the exterior flange 14. The installation process is completed by pushing against the outside of the windshield frame on the latch side toward the cab with enough force to connect the automatic latches to the cab. In order to accomplish that, the weather strip must also be compressed under the latch side of the windshield by a certain pre-defined amount. In one embodiment the latches are configured to require the weather strip to compress on the latch side and around the remainder of the windshield by substantially the same amount as on the pivot side when the windshield is latched down.

Windshield Removal

As noted above, the windshield may be removed either from inside or outside the vehicle cab. From inside the vehicle cab the windshield may be removed by first pressing on the push plate 34 toward the windshield, or outward, to simultaneously release both automatic latches 31. Removal is then completed by continuing to push outward on the push plate or windshield with enough force to dislodge the latch side of the windshield from the cab opening, and pivot the windshield about the cab center pillar until it falls away from the cab. If the vehicle is on its side, typically it is the windshield panel that is positioned farthest away from the ground that is removed, because gravity helps the process of pivoting the windshield away from the cab once the rotation passes through vertical.

Removing the windshield from outside the cab is performed in essentially the same manner, except that instead of pressing on the push plate 34 to release the latches, the push plate is pulled toward the windshield by pulling on the ends of the guide bolts 35 with the dedicated handle tool after removing the protective cover 39.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. A removable ballistic resistant windshield for vehicle egress, comprising:
   a ballistic resistant glass panel;
   a rectangular windshield frame disposed about the glass panel, the windshield frame having a perimeter portion configured to fit within a rectangular opening in a vehicle cab, and an exterior flange configured to overlay an outside surface of the opening in the vehicle cab;

an interior flange extending from the windshield frame opposite the exterior flange, the interior flange and the exterior flange together defining an open channel on a first side of the windshield frame configured to fit around a vertical portion of the opening in the vehicle cab when the windshield is seated in the opening; and a latch operable from inside the vehicle cab to release a second, opposite side of the windshield frame from the opening in the vehicle cab.

2. The removable ballistic resistant windshield of claim 1, wherein the interior flange extends at an angle away from a plane parallel to the glass panel such that a width of the open channel increases with distance from a perimeter edge of the glass panel.

3. The removable ballistic resistant windshield of claim 2, wherein the angle of the interior flange to a plane parallel to the glass panel is between about twenty and thirty degrees.

4. The removable ballistic resistant windshield of claim 2, wherein the angle of the interior flange to a plane parallel to the glass panel is sufficient to allow the windshield to be installed from outside the vehicle cab by first fitting the open channel around the vertical portion of the opening in the vehicle cab, and then rotating the windshield about the vertical portion of the opening toward the vehicle cab until the entire perimeter portion of the windshield frame is seated in the opening.

5. The removable ballistic resistant windshield of claim 1, wherein the interior flange is configured to bear against a beveled interior surface of the vertical portion of the opening in the vehicle cab.

6. The removable ballistic resistant windshield of claim 5, wherein the beveled interior surface of the vertical portion of the opening is on a separate element attached to the opening and made of a low friction material.

7. The removable ballistic resistant windshield of claim 5, wherein the interior flange has a slot configured to receive a guide feature protruding from the vertical portion of the opening in the vehicle cab.

8. The removable ballistic resistant windshield of claim 7, wherein the slot is configured to engage the guide feature during an installation of the windshield from outside the vehicle cab, and maintain the first side of the windshield in vertical alignment with the opening.

9. The removable ballistic resistant windshield of claim 1, wherein the latch is configured to automatically latch to the vehicle cab when the second side of the windshield frame is pushed into the opening.

10. The removable ballistic resistant windshield of claim 9, wherein the latch includes a plate that is accessible from inside the vehicle cab, and configured to release the latch when the plate is pushed toward the windshield.

11. The removable ballistic resistant windshield of claim 9, wherein the latch is a spring-loaded automobile door latch.

12. A removable windshield for use in combination with a vehicle cab configured with left and right rectangular windshield openings separated by a center pillar that defines one side of each windshield opening, the removable windshield comprising:

a glass panel mounted in a rectangular windshield frame having a perimeter portion configured to fit within one of the windshield openings, and an exterior flange configured to overlay an outside surface of the one windshield opening;

an interior flange extending from the windshield frame opposite the exterior flange, the interior flange and the exterior flange together defining an open channel on a first side of the windshield frame configured to fit around a first side of the center pillar; and a latch operable from inside the vehicle cab to release a second, opposite side of the windshield frame from a side of the one windshield opening opposite the center pillar.

13. The removable windshield of claim 12, wherein the interior flange extends at an angle away from a plane of the glass panel such that a width of the open channel increases with distance from a perimeter edge of the glass panel.

14. The removable windshield of claim 13, wherein the angle of the interior flange to the plane of the glass panel is between about twenty and thirty degrees.

15. The removable windshield of claim 13, wherein the angle of the interior flange to the plane of the glass panel is sufficient to allow the windshield to be installed from outside the vehicle cab by first fitting the open channel around the first side of the center pillar, and then rotating the windshield about the center pillar toward the vehicle cab until the windshield is seated in the one windshield opening.

16. The removable windshield of claim 12, wherein the interior flange is configured to bear against a beveled interior surface of the first side of the center pillar when the windshield is seated in the one window opening.

17. The removable windshield of claim 16, wherein the beveled interior surface of the first side of the center pillar is on a separate element attached to the center pillar and made of a low friction polymer material.

18. The removable windshield of claim 16, wherein the interior flange has a slot configured to receive a guide feature extending from the center pillar.

19. The removable windshield of claim 18, wherein the slot is configured to engage the guide feature during an installation of the windshield from outside the vehicle cab, and maintain the first side of the windshield in vertical alignment with the one windshield opening.

20. The removable windshield of claim 19, wherein the piloting feature is a round post with a diameter less than a width of the slot in the interior flange.

21. The removable windshield of claim 12, wherein the latch is a spring loaded automobile door latch configured to automatically latch to the vehicle cab when the second side of the window frame is pushed into the framed opening.

22. The removable windshield of claim 21, wherein the latch includes a plate accessible from inside the vehicle cab and configured to release the latch when the plate is pushed toward the windshield.

23. The removable windshield of claim 21, further comprising a second spring loaded latch on the second side of the windshield frame, and a second slot in the interior flange configured to engage a second piloting feature on the center pillar.

24. The removable windshield of claim 21, further comprising:

a second glass panel mounted in a second windshield frame having a second perimeter portion configured to fit within the other one of the windshield openings, and a second exterior flange configured to overlay an outside surface of the other one of the windshield openings;

a second interior flange extending from the second windshield frame opposite the second exterior flange, the second interior flange and the second exterior flange together defining an open channel on a first side of the second windshield frame configured to fit around a second side of the center pillar; and a latch operable from inside the vehicle cab to release a second, opposite side of the second windshield frame from the other one of the windshield openings.

25. A method of removing a windshield from within a vehicle cab configured with left and right rectangular windshield openings separated by a center pillar that defines one side of each windshield opening, wherein each windshield opening contains a windshield comprising a glass panel mounted in a windshield frame, the method comprising the steps of:

releasing a spring-loaded latch holding a first side of a first windshield in one of the windshield openings, wherein the windshield frame on a second, opposite side of the first windshield is piloted to the center pillar;

pushing outward on the first side of the first windshield with sufficient force to dislodge the first windshield from the one windshield opening, and cause the first windshield to swing away from the cab as it pivots about the center pillar.

26. The method of claim 25, wherein the windshield frame on the second side of the first windshield is configured to release from the center pillar and allow the first windshield to fall away from the vehicle cab after swinging away by a sufficient amount.

27. The method of claim 25, wherein releasing the spring loaded latch comprises pushing a plate that is operatively connected to the latch and accessible from inside the vehicle cab.

28. The method of claim 25, wherein the windshield frame includes exterior and interior flanges that extend from the second side of the frame and capture the center pillar.

29. The method of claim 28, wherein causing the first windshield to swing away from the cab as it pivots about the center pillar causes the interior flange extending from the frame to slide across a beveled interior surface on the center pillar.

\* \* \* \* \*